United States Patent
Cobb

[11] 3,759,594
[45] Sept. 18, 1973

[54] METHOD AND APPARATUS FOR STORING CUTTING IMPLEMENTS

[76] Inventor: Jack M. Cobb, Box 422, San Juan Capistrano, Calif. 92675

[22] Filed: Dec. 2, 1971

[21] Appl. No.: 203,956

[52] U.S. Cl. .............................. 312/31, 206/16 A
[51] Int. Cl. ......................................... A24f 25/00
[58] Field of Search ...................... 312/31–31.06, 31.1–31.3; 206/16 A, 16 B, 16 S, 46 BL; 21/88–90

[56] References Cited
UNITED STATES PATENTS

| 612,861 | 10/1898 | Miranda.................. | 312/31.2 UX |
| 3,352,630 | 11/1967 | Fischer et al. ........... | 206/16 A X |
| 1,615,396 | 1/1927 | Lorenz..................... | 206/16 A |
| 2,707,551 | 5/1955 | Shnitzler et al. ......... | 206/16 B |
| 3,045,812 | 7/1962 | Randolph................. | 206/16 A |

*Primary Examiner*—James C. Mitchell
*Attorney*—Dean Sandford

[57] ABSTRACT

A method and apparatus for storing cutting implements that substantially eliminates deterioration of the cutting edge and metal surfaces adjacent to the cutting edge caused by corrosion of the metal between intermittent uses of the cutting implement. The apparatus comprises a container adapted to receive the cutting implement and support it so that the cutting edges are in close proximity to a body of volatile corosion inhibitor, which can be a wicking material impregnated with a liquid agent or a body of solid agent. One embodiment of the device is especially adapted for storage of a safety razor between intermittent shaving operations.

23 Claims, 5 Drawing Figures

PATENTED SEP 18 1973

3,759,594

INVENTOR.
JACK M. COBB
BY Dean Sandford
ATTORNEY

METHOD AND APPARATUS FOR STORING CUTTING IMPLEMENTS

This invention relates generally to the field of cutting implements, and more particularly to methods and apparatus for preventing deterioration of the cutting edge of a cutting implement during storage between intermittent uses. One specific embodiment of the invention relates to a method and apparatus for storing a safety razor between shaving operations that maintains the cutting edge of the razor blade substantially indefinitely in the same condition that it is in after completion of the shaving operation.

It is well known that corrosion contributes substantially to the deterioration of metallic cutting edges exposed to oxygen, water and other corrosive elements, and in many cases the deterioration attributable to corrosion far exceeds that caused by wear of the cutting edge during a cutting operation. This is particularly true where the cutting implement is intermittently used and then stored in an atmospheric environment. Although corrosion of steel cutting implements can to some extent be ameliorated by the use of stainless steel and other corrosion resistant steel alloys, nevertheless, deterioration of the cutting edge due to corrosion in many cases substantially limits the life of the implement or necessitates frequent sharpening to maintain the cutting edge. While various packaging techniques have been developed to protect cutting implements from corrosion during distribution to the user, this protection is lost when the package is opened and the cutting implement exposed to a corrosive environment such as is encountered in the atmospheric storage of the implement between cutting operations.

In the case of razor blades, it is common experience, particularly when steel safety razor blades are used, to obtain a smooth and comfortable shave the first time that a new blade is used, yet a short time later find that the same blade is dull and all but impossible to use. This deterioration of the cutting edge of a razor blade is not only rapid, but appears to take place whether the blade is merely rinsed after being used or is rinsed and carefully dried.

With modern manufacturing techniques, it is possible to manufacture razor blades having exceedingly sharp cutting edges, with these blades being in the main of uniform high quality. Typically, the blades are covered with a fine film of oil, wax, or plastic material, and often further protected by a corrosion inhibitor incorporated into the coating or into the wrapping material used to package the blade. As a result of this packaging, each new blade when first used is in substantially the same condition as when manufactured.

The cutting edge of a safety razor blade when first used constitutes a line of microscopic width that forms the apex of two oppositely opposed elongate tapered surfaces. That portion of the blade adjacent the cutting edge is extremely thin, but due to the high quality of the steel used in the blades, has substantial strength and resistance to abrasion. When the cutting edge of a used razor blade is examined under a microscope immediately after its first use, it will be seen to have honing striations formed therein and portions thereof sometimes have burrs, but these defects in the cutting edge are so small the cutting action thereof will not be appreciably impaired.

However, the physical condition of the cutting edge of a razor blade immediately after the first use thereof and the condition of the cutting edge of the same blade after even a short period of storage are not one and the same. Examinations of the blade even one day later will show that the original microscopic striations and burred portions are not the only imperfections in the cutting edge and the cutting surfaces adjacent thereto, but the cutting surfaces and edge of the blade have an irregular, jagged appearance caused by corrosion of the metal.

The reason for this relatively rapid change in the exterior surface of the metal defining the blade cutting surfaces and the edge is that after the first shave this metal has been subjected to the corrosive action of oxygen, moisture, acidic materials from the skin, and alkaline agents in the shaving cream. Even though the blade is carefully dried thereafter, sufficient portions of these constituents remain to cause substantial corrosion of the metal. In addition, when stored under ambient conditions, the blade is exposed to atmospheric oxygen and moisture, and to any other corrosive agents that may be present in the atmosphere. The metal of the blade is subjected both to chemical attack by the reactive materials with which it is contacted and by electrolytic corrosion caused by differences in oxygen concentration at various portions of the surface. This electrolytic corrosion may, and usually does, proceed to the degree that the cutting edge and the cutting surfaces are severely pitted, with the striations and other imperfections already therein being greatly enlarged by the combined chemical and electrolytic action. Due to this corrosive action, the cutting edge and cutting surfaces of a used blade may, within a days time, become so severely pitted and roughened as a result thereof as to render the blade incapable of being used to obtain a smooth shave. Although the corrosive action occurring between the first use of a blade and the re-use thereof has been described, it will be apparent that this is an action which occurs to an even greater degree after the first re-use of the blade. The rate of corrosion can be reduced by the use of stainless steel and other special chromium and platinum alloy steels. This reduces the corrosion rate and extends the blade life somewhat, but does not substantially eliminate deterioration of the cutting edge caused by corrosion.

It has been proposed that corrosion of a cutting edge can be reduced or substantially eliminated by immersing the cutting edge in an oil containing a corrosion inhibitor or by applying such oil to the cutting edge after each use of the cutting implement. While some reduction in corrosion can be achieved by this treatment and this method has been employed in protecting various indistrial cutting implements, it is generally unsatisfactory because the oil coating is messy and unsanitary, and in many applications, the oil must be substantially removed before the cutting implement can be used. Thus, need exists for a simple, convenient, inexpensive device for storing cutting implements that substantially eliminates corrosion of the cutting edge and cutting surfaces during storage between intermittent uses.

Accordingly, a primary object of this invention is to provide a method and device for protecting the cutting edge of a steel cutting implement from corrosion during storage of the implement between intermittent uses.

Another object of the invention is to provide a method and apparatus for extending the life of the cutting edge of a steel cutting implement used intermittently.

Still another object of the invention is to provide a device for storing a steel cutting implement between intermittent uses and re-uses under conditions that prevent or substantially retard corrosion of the cutting edge and metal surfaces adjacent to the cutting edge.

Yet another object of the invention is to provide a method and apparatus for storing a steel cutting implement under conditions that prevent or substantially retard corrosion of the cutting edge and metal surfaces adjacent to the cutting edge without special pre-storage cleaning or treatment of the implement.

A further object of this invention is to provide a method and device for protecting the cutting edge of a razor blade from corrosion during storage of the implement between intermittent uses.

A still further object of this invention is to provide a method and apparatus for extending the life of the cutting edge of a razor blade used intermittently.

A yet further object of the invention is to provide a device for storing a safety razor between intermittent uses and re-uses under conditions that prevent or substantially retard corrosion of the cutting edges and metal surfaces of the razor blade adjacent to the cutting edges.

An even further object of the invention is to provide a method and apparatus for storing a safety razor under conditions that prevent or substantially retard corrosion of the cutting edges and metal surfaces of the razor blade adjacent to the cutting edges without special pre-storage cleaning or treatment of the blade.

Other objects of the invention will be apparent to those skilled in the art from the following description.

Briefly, this invention contemplates a method for storing cutting implements that substantially eliminates deterioration of the cutting edge and metal surfaces adjacent to the cutting edge caused by corrosion of the metal between intermittent uses of the cutting implement. The apparatus comprises a container adapted to receive the cutting implement and support it so that the cutting edges are in close proximity to a body of volatile corrosion inhibitor, which can be a wicking material impregnated with a liquid agent or a body of solid agent. In the case of cutting implements that may be stored between uses with even a small amount of moisture on the implement, it is preferred that the container be vented to the atmosphere to prevent accumulation of moisture in the container.

In its broadest aspect, the method and apparatus of this invention has application to the storage of knives, chisels, drill bits, sculpting tools, Xacto blades, surgical implements, safety razor blades, straight edge razors, and other cutting implements subject to corrosion of the cutting edge between intermittent uses. One embodiment of the device is especially adapted for storage of a safety razor between intermittent shaving operations.

The apparatus of this invention includes a container or receptacle of a size and shape adapted to receive the particular cutting implement to be stored and having a cover adapted to substantially close the storage container, and including means to support the cutting implement in the container during storage. A body of volatile corrosion inhibitor is located in the container so as to be adjacent to the cutting edge when the implement is placed within the container. The configuration of the body of volatile corrosion inhibitor is preferably adapted so that the cutting edge or edges of the implement is in proximity to the body of corrosion inhibitor along its entire length, without actually contacting the corrosion inhibitor.

The invention will be more readily understood by reference to the following detailed description and the accompanying drawings, in which.

Figure 1:
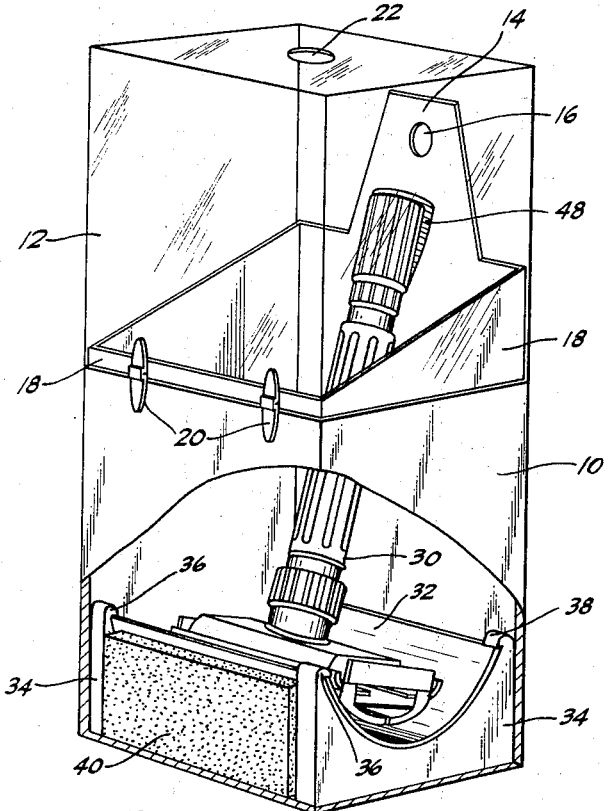
FIG. 1 is a partially cut away perspective view illustrating the apparatus of this invention adapted for storage of a safety razor.
Figure 2:
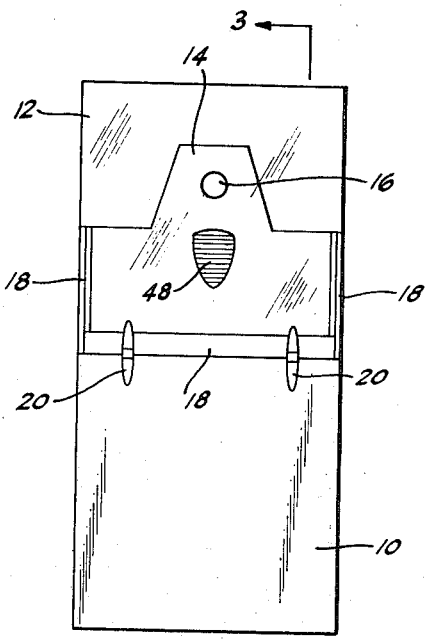
FIG. 2 is a front elevation view of the apparatus illustrated in FIG. 1.
Figure 3:
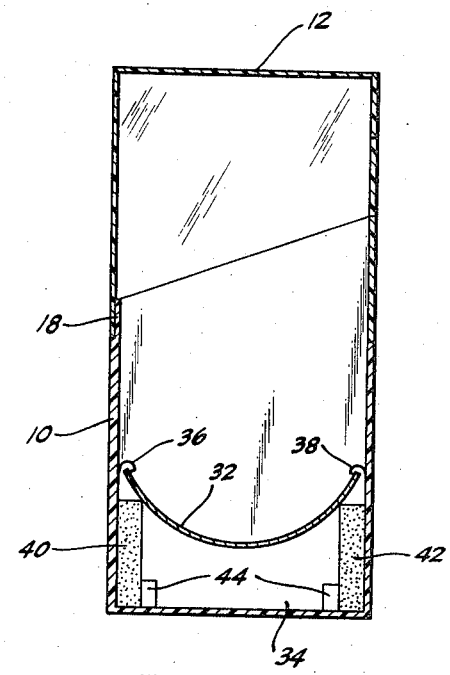
FIG. 3 is a cross-sectional view taken along the line 3—3 of FIG. 2.

Referring specifically to FIGS. 1, 2 and 3, the illustrated safety razor storage device is comprised of an open topped container 10 having a cover 12 adapted to mate therewith so as to substantially close the open top of the container. The rear panel of container 10 is higher than the front panel, and terminates in a tab section 14 having an aperature 16 adapted to receive a mounting screw for attaching the device to the wall or other suitable vertical surface. The top edge of the side panels of container 10 are slanted from the front to the rear. The upper edge of the front panel and both side panels are recessed at 18 to accommodate the downwardly extending front and side panel sections of cover 12. The rear panel of cover 12 is formed to mate with the upper edge of the rear panel section of container 10 and abutts thereagainst. Cover 12 can merely rest on container 10, or optionally, cover 12 can be pivotally attached to container 10 by means of a hinge or hinges, such as the pair of hinges 20. While container 10 is illustrated as an integrally formed, molded member of opaque plastic material having a generally rectangular cross section, it is to be recognized that the device may be constructed in a variety of shapes and configurations, and of different materials, without detracting from its utility. Similarly, while cover 12 is illustrated as an integrally formed, molded member of a transparent plastic material, it can be constructed of a variety of materials and configurations adapted to enclose the top of container 10. Top 12 is preferably provided with aperture 22 to vent the contents of the container to the atmosphere.

A cradle 32 having a curved cross section transverse to its longitudinal axis and extending substantially across the container 10 is provided as a means to support a safety razor 30 in the container 10 and to divide the container into an upper razor storage chamber and a lower chamber containing the volatile corrosion inhibitor. A pair of support members 34 having the desired curved configuration and terminating in lips 36 and 38 are located on the interior of container 10, one of the members being located adjacent to the lower section of each of the side panels of the container. Cradle 32 can be a thin, flat, flexible plastic member and can be snapped into place and retained in the curved configuration by the lips 36 and 38.

A pair of absorbent wicks 40 and 42 saturated with a liquid volatile corrosion inhibitor of a type that will be hereinafter more fully described are located in the lower chamber of container 10. The wicks are maintained in a position adjacent the front and rear edge of cradle 32 by means of a pair of retainers 44 fixed to the bottom of container 10. While this embodiment is illustrated in use with a liquid volatile corrosion inhibitor, wicks 40 and 42 can be omitted and a body of solid volatile corrosion inhibitor placed in the lower chamber of container 10. The wicks 40 and 42 can be formed of any suitable absorbent material of natural or synthetic origin, such as cotton, hemp, wool, rayon, and like fibers, and natural or synthetic sponge, in the form of pads, as illustrated, or in the form of strips, rolls, or wads.

Support members 34 and retainers 44 can be separately formed and fastened in the molded container 10 by plastic glue, a suitable plastic solvent that dissolves the plastic sufficiently to bond the parts to the container, or by ultrasonic welding; or alternatively, either or both of the support members 34 and retainers 44 can be formed integrally with container 10 during the modling process.

Optionally, a depression 48 can be provided on the interior surface of tab section 14 of the rear panel of container 10 to receive the upper end of the handle of safety razor 30.

Figure 5:
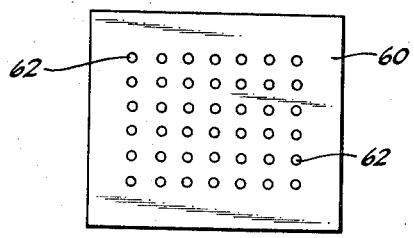
FIG. 5 is a plan view of the perforate support plate employed in the embodiment of FIG. 4.
Figure 4:
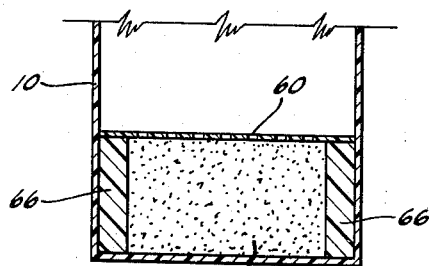
FIG. 4 is a cross-sectional view taken along the line 3—3 of FIG. 2 illustrating another embodiment of the device.

Another embodiment of the invention particularly adapted for use with a solid volatile corrosion inhibitor is illustrated in FIGS. 4 and 5. In this embodiment, a flat, perforate support plate 60 having a plurality of perforations 62 arranged in a convenient pattern and extending substantially across the cross section of container 10 is mounted in the container 10 to divide the container into an upper razor storage chamber and a lower chamber containing a particulate mass 64 of volatile corrosion inhibitor. Support plate 60 is supported within container 10 by a pair of support members 66 integrally molded with the container 10, or separately formed and fixedly placed therewithin. Alternatively, support member 66 can comprise a shoulder integrally formed with the container and extending around the periphery thereof.

In practicing the method of this invention, the cutting implement is cleaned and dried after use in the manner customary for that particular type of cutting implement. The implement is then placed in the storage container in close proximity to a reservoir of volatile corrosion inhibitor which can be a wick saturated with a liquid agent or a body of solid agent, but the cutting edge is preferably out of contact with the agent. It has been found that if the cutting edge is placed in direct contact with the volatile corrosion inhibitor and particularly where an oily carrier is employed, the oil can encapsulate minute droplets of water on the metal surface which form cells that actually promote pitting type corrosion of the metal.

In the case of practicing the method to prevent corrosion of a razor blade during storage, at the completion of the shaving operation the razor and blade are rinsed off in warm water in a normal manner and the assembled razor and razor blade placed in the storage container immediately adjacent to, but out of contact with the body of volatile corrosion inhibitor. The assembled razor and blade can be easily removed from the storage container and used in a shaving operation. Preferably, the razor and blade are rinsed in warm water prior to use.

Where the razor or other cutting implement is placed in the container with even minute amounts of moisture adhering thereon, the moisture can accumulate in the container and tend to accelerate the rate of corrosion, even in the presence of the volatile corrosion inhibitor. Thus, it is preferred that the container be vented to the atmosphere to prevent accumulation of the water vapor, although the adverse effect of the moisture can be somewhat ameliorated by proper selection of the volatile corrosion inhibitor.

Because of variations in skin and beard types and the differences in comfort level expected, the increase in razor blade life obtained will vary depending on the user. However, it has been established with different users and with a number of different types of commercially available razor blades that protection of the razor blade during storage between intermittent shaving opersions in accordance with this invention will increase the number of shaves comfortably obtainable with a razor blade at least five fold over that obtainable with atmospheric storage.

The volatile corrosion inhibitor composition can be selected from a large class of chemical compounds that are known to volatilize extremely slowly to release agents into the atmosphere which effectively permeate the atmosphere aurrounding the cutting implement and deposit a thin film of corrosion inhibitor on the steel cutting edge and metal surfaces adjacent to the cutting edge. Corrosion inhibiting compositions useful in the practice of this invention exhibit vapor pressures at 20° C. of at least about 0.00001 mm Hg and not greater than about 0.1 mm Hg. Those agents exhibiting vapor pressures of less than about 0.00001 mm Hg generally do not provide sufficient corrosion protection and those agents exhibiting vapor pressures above about 0.1 mm Hg are generally so volatile that they are too rapidly vaporized to provide lasting protection. Preferably, the vapor phase corrosion inhibitors used in the practice of this invention exhibit vapor pressures at 20° C. of about 0.00001 to 0.01 mm Hg.

The volatile corrosion inhibitor may be used in liquid or solid form, or may be dissolved in a suitable aqueous or non-aqueous solvent. A preferred solvent for many of the volatile corrosion inhibitors is mineral oil, and particularly a mineral lubricating oil having a viscosity of about 100 to 1,000 SSU at 100° F. Masking agents or perfumes can be added to the corrosion inhibitor composition, if desired, to mask its odor or improve its scent.

Volatile corrosion inhibitors that can be used in the practice of this invention include various inorganic nitrites such as alkali metal nitrites, exemplary of which is sodium nitrite, and admixtures of an alkali metal nitrite and an alkali metal phosphate, exemplary of which is an admixture of sodium nitrite and about 5 to 75 percent sodium phosphate, and particulary an admixture of 3 parts of sodium nitrite to 1 part of sodium tribasic phosphate. Also, a wide variety of organic nitrites can be employed as the volatile corrosion inhibitor. These are generally salts of organic bases and nitrous acid, and particularly the nitrous acid salts of (1) primary amines such as primary amines in which the amine groups are attached to a secondary or a teritary aliphatic carbon atom, primary amines in which the amine group is attached to an arylalkyl group, and primary amines which react with nitrous acid in the presence of an excess of the amine to produce a primary amine nitrite salt; (2) secondary amines such as secondary amines in which the amine group is attached to an aliphatic carbon atom, preferably a secondary or teritary carbon atom, and wherein the aliphatic groups attached to the nitrogen may be joined to form a ring that is either N-alicyclic or a heterocyclic ring containing oxygen and/or sulfur; (3) teritary amines; and (4) quaternary ammonium bases. Specific organic nitrites that can be employed include methylamine nitrite, isopropylamine nitrite, 2-amino-butane nitrite, teritary butyl amine nitrite, 2-amino-4-methyl-pentane nitrite, various amyl, heptyl, octyl and higher homologous amine nitrites wherein the amine group is attached to a secondary or teritary carbon atom, cyclopentylamine nitrite, alkylated cyclopentylamine nitrites, cyclohexylamine nitrite, monomethyl cyclohexylamine nitrite, dimethyl cyclohexylamine nitrite, trimethyl cyclohexylamine nitrite, other alkylated cyclohexylamine nitrites, bornyl amine nitrite, fenchyl amine nitrite, cycloterpenyl amine nitrite, pinyl amine nitrite, benzylamine nitrite, betaphenyl-ethylamine nitrite, alkylated benzylamine nitrite, tetrahydro beta-naphthylamine nitrite, allylamine nitrite, beta-methyl allylamine nitrite, beta-chloro allylamine nitrite; di-methyl-, di-ethyl-, di-n-propyl-, and diisopropyl- amine nitrites, various secondary amine nitrites derived from amyl, hexyl, heptyl, octyl and higher homologous groups; methyl isobutyl amine nitrite, N-methyl N-tertiary-butyl amine nitrite, N-alkyl N-cyclohexyl amine nitrite, N-alkyl N-bornyl amine nitrite, di-bornyl amine nitrite, N-methyl N-cycloterphenyl amine nitrite, N-isopropyl N-(1)-methyl amine nitrite, N-alkyl N-benzyl amine nitrite, dicyclopentyl amine nitrite, dicyclohexyl amine nitrite, alkylated dicyclohexyl amine nitrite, diphenylamine nitrite, dibenzylamine nitrite, di(beta phenyl ethyl) amine nitrite, piperidine nitrite, piperazine nitrite, alkylated piperidine or piperazine nitrite, 1,4-alkylated and unalkylated oxazine nitrites such as morpholine nitrite and 2,4,4,6-tetramethyl tetrahydro-1,3-oxazine nitrite, and alkylated 1,3-thiazine nitrites such as 2,4,4,6-tetramethyl tetrahydro-3-thiazine nitrite; trimethylamine nitrite, triethylamine nitrite, tri-n-propylamine nitrite, triisopropylamine nitrite, tributylamine nitrite, higher homologous and isomeric trialkylamines, variously N-substituted tertiary amine nitrites having different organic radicals on the amino nitrogen atom, e.g., alkyl, alicyclic, bornyl, fenchyl, arylalkyl, and like homologs and analogs, and teritary amine nitrite type derivatives of alkylene diamines; tetramethyl and higher tetra-alkyl ammonium nitrites, trimethyl benzyl ammonium nitrite, trimethyl cyclohexyl ammonium nitrite, tributyl decyl ammonium nitrite, quaternary N-substituted ammonium nitrites having various organic radicals on the quaternary nitrogen atom, pyridinium and alkylated pyridinium or quinolinium quaternary ammonium nitrites having an alkyl, cycloalkyl or arylalkyl group on the quaternary nitrogen atom including methyl, butyl, cyclohexyl and benzyl groups and like homologs and analogs.

Other organic nitrite salts that are particularly useful as volatile corrosion inhibitors are those having a heterocyclic organic radical containing four substituted or unsubstituted carbon atoms, an amino nitrogen atom, and an oxygen atom, the said amino nitrogen atom and the said oxygen atom being in the 1,3 position relative to each other, and those which have a six-membered cyclic structure containing four substituted or unsubstituted carbon atoms, an amino nitrogen atom and an oxygen atom, the latter two atoms being in the 1,4 position relative to each other. Exemplary of these materials are 2,4,4,6-tetramethyltetrahydro-1,3-oxazine nitrite and morpholine nitrite (tetrahydro-1,4-oxazine nitrite).

Also, certain amine salts of carboxylic acids are effective volatile corrosion inhibitors such as salts of non-aromatic amines having not more than 35 carbon atoms per molecule and carboxylic acids having a dissociation constant between about $10^{-3}$ and $10^{-8}$. Exemplary of this class of volatile corrosion inhibitors are the amine and ammonium salts of carboxylic acids such as the fatty acids of lauric, palmitic, stearic, n-butyric, and the like; unsaturated acids such as oleic, maleic, and the like; dibasic acids such as carbonic, phthalic, oxalic, maleic, malonic, succinic, glutaric, adipic pinelic, etc.; and aromatic acids such as benzoic, salicylic, and the like.

While the foregoing volatile corrosion inhibitors are effective in preventing corrosion of various ferrous metals such as steels as well as couples of steels with aluminum, copper, nickel, chromium, or other metals and their alloys, more satisfactory inhibition of corrosion of copper and copper alloys such as brass and bronze is obtained when small amounts of volatile carbonates such as ammonium carbonate or an organic nitrogen base carbonate, for example, di-isopropyl ammonium bicarbonate, or dicyclohexyl ammonium bicarbonate are present in the vapor phase along with the inhibitor.

Another class of compounds useful as volatile corrosion inhibitors are the lower alkylol amines such as ethyl diethanolamine, butyl monoethanolamine, ethyl monoethanolamine, butyl diethanolamine and di-n-butylamino ethanol.

Still another class of volatile corrosion inhibitors are admixtures of an organic amide, such as various mono-amides, diamides and polyamides, and an inorganic nitrite such as the alkali metal nitrites and other water-soluable nitrites exemplary of which are sodium nitrite, potassium nitrite, ammonium nitrite and silver nitrite. The mono-amides are aliphatic amides containing up to 25 carbon atoms in the aliphatic radical, exemplary of which are acetamide, propionamide, N-butyramide, N-valeramide, stearamide, palmitylamide and fatty acid amides, or the mono-amides can be acyclic or alkylacyclic amides such as benzamide and the acyclic acid amides, or the type such as benzene sulphonic acid amide, toluene sulphonic acid amide, naphthalene sulphonic acid amide, and the like. Exemplary of the diamides are urea, N-substituted ureas, unsymetrical ureas such as N-N,-dibutyl urea, N-butyl urea, N-propyl urea, dimethyl urea, t-butyl urea, t-amyl urea, and the like, and other diamides, such as buramines (the reaction product of amines such as butyl amine with urea), the reaction product of amines with biuret, and quanidine and derivatives thereof. A suitable polyamide is illustrated by biuret. Good results are obtained when the aforesaid compounds are utilized in the ratio of about one part by weight of the inorganic nitrite to from about 0.05-20 parts by weight of the amides, and particularly advantageous results are obtained by the use of substantially equal parts by weight of the inorganic nitrite and the organic amide.

The foregoing admixtures of inorganic nitrite and organic amide can be rendered even more effective in protecting ferrous metals from corrosion by the incorporation therein or conjoint use therewith of salts of benzoic acid. The action of the salts of benzoic acid appears to synergize the activity of the organic amide-inorganic nitrite compositions so as to bring about a marked enhancement of the corrosion inhibiting properties of the latter compositions. Among the various salts of benzoic acid which can be utilized are inorganic metal, including alkali metal, and amine salts as, for example, sodium, potassium, ammonium, lithium, calcium, magnesium, barium, aluminum, iron, trimethylamine, isopropylamine, ethylamine, diethylamine, trimethylamine, tripropylamine, tributylamine, cyclohexylamine, dicyclohexylamine, 2-hydroxyethylamine, bis-(2-hydroxyethyl) amine, tris-(2-hydroxyethyl) amine, betahydroxyisopropylamine, bis-(betahydroxyisopropyl) amine, propylamine, butylamine, N,N-dimethyl-2-hydroxyethyl amine, N,N-diethyl-2-hydroxyethylamine, benzylamine, naphythylamine, triamylamine, dimethylbenzylamine, (dimethyl) (cyclohexyl) amine, methyl benzylamine, piperidine, pyridine, lutidine morpholine diphenylamine, 2-phenylethyl-amine, alpha-methyl-beta-hydroxyisopropylamine, and the like. Also, the functioning of the aforesaid mixtures of inorganic nitrite and organic amide can be improved by the incorporation therein or conjoint use therewith of amine and ammonium salts of carboxylic acids containing from 6 to 18 carbon atoms.

One preferred liquid volatile corrosion inhibitor is a solution of dicyclohexylamine caprylate, diisopropyl amine caprylate, or admixtures thereof in a mineral oil such as a light lubricating oil, e.g., an SAE 5 lubricating oil.

Another preferred volatile corrosion inhibitor composition is an admixture of sodium nitrite, urea and monoethanolamine benzoate.

A particularly preferred solid volatile corrosion inhibitor for use in the method of this invention is diisopropylammonium nitrite, dicyclohexylammonium nitrite and admixtures of between about 0.1 to 5 parts by weight of diisopropylammonium nitrite per part of dicylohexylammonium nitrite. The diisopropylammonium nitrite is the more volatile agent and provides more rapid corrosion protection, while the dicyclohexylammonium nitrite provides longer duration protection.

The invention is further illustrated by the following examples which are illustrative of specific modes of practicing the invention and not intended as limiting the scope of the invention as defined by the appended claims.

EXAMPLE 1

A series of shaving tests are conducted with a number of different types of razor blades over a 4 year period to determine the effect of protecting the razor blade during stroage between uses by the method and apparatus of the present invention. The subject in each test is the same individual, who is characterized as having a medium beard and medium sensitivity skin. Each test is conducted by shaving in a normal manner with a new blade, rinsing the blade off in hot water at the conculsion of the shaving operation, and shaking the razor and the blade to remove excess water. The shaving operation is repeated once each day with the same blade until the razor tends to pull and the shave no longer feels comfortable. The test blade is then replaced with a new blade and a new test started.

In one series of tests, the razor containing the test blade is stored between shaving operations under normal atmospheric conditions. In another series of tests, the razor containing a test blade of the same type is stored between shaving operations in a closed polyethylene container having an aperture in its top to vent the contents to the atmosphere. The container contains two cotton rolls saturated with a liquid volatile corrosion inhibitor. The volatile corrosion inhibitor employed in all of these tests is an admixture of diisopropylamine caprylate, dicyclohexylamine caprylate, a minor amount of an amine sulfonate, and an SAE 5 lubricating oil, which material is marketed by the Daubert Chemical Company under the trademark VCI 105. A number of duplicate tests are performed to verify the repeatability of the results.

The results of these tests are reported in Table 1.

TABLE 1

COMPARATIVE SHAVING TESTS

| Blade tested | Type | Number of shaves obtained Atmospheric Storage | Protected Storage |
| --- | --- | --- | --- |
| Gillette Blue Blade[1] | Double Edge | 5–7 | 25–35 |
| Gillette Super Blue Blade[1] | Double Edge | 5–10 | 25–50 |
| Gillette Stainless Blade[1] | Double Edge | 10 | 50 |
| Shick Super Stainless[2] | Double Edge | 10–15 | 50–90 |
| Schick Super Stainless[2] | Injector-single edge | 10 | 60 |
| Schick Krona Chrome[2] | Double Edge | 30 | 180 |

1. Marketed by the Gillette Company
2. Marketed by Schick Incorporated

These tests demonstrate that while the number of shaves obtainable with a commercial razor blade varies greatly with the type of blade, the number of shaves obtainable with any particular type of blade can be increased 5 to 6 fold by storing the razor blade between shaves in the presence of a volatile corrosion inhibitor.

EXAMPLE 2

Another comparative test is conducted with a subject having a medium beard and sensitive skin. The subject had developed a normal use history with Gillette Super Stainless blades and regularly found these blades to be almost unsatisfactory with the fifth shave, and had developed a pattern of discarding the blade after the fifth shave. A new Gillette Super Stainless blade is used and stored between shaves in the presence of a volatile corrosion inhibitor substantially in accordance with the method described in Example 1, excepting that for approximately one-third of the test period the razor storage container is maintained on its side. After 29 shaves, the blade was considered unsatisfactory.

EXAMPLE 3

This test was conducted by a subject having a medium beard and very sensitive skin. For a period of over 2 years this individual had regularly shaved with Gillette Super Stainless razor blades marketed by the Gillette Company, and had found it necessary to change the blade once every week (after 7 shaves) to maintain comfortable shaving. During the pretest experience, it was noted that occasionally the facial tissue would be cut the first time a new blade was used and that because of the extremely sensitive nature of the subject's skin, shaving with a dull blade was a very uncomfortable experience.

The test was conducted by first shaving in a normal manner with a new Gillette Super Stainless razor blade, and then storing the blade in the presence of a volatile corrosion inhibitor substantially in accordance with the method described in Example 1, except that between shaves the container was kept on its side in a drawer.

The test blade was used every day except one for a period of 61 days, thus providing a total of 60 shaves. The results of this test were reported to be extremely satisfactory from both a personal comfort and a financial standpoint. The blade remained sharp with very gradual dulling after approximatley 6 weeks of use, resulting in close and clean shaves throughout the duration of the test. The test was terminated because the blade appeared to be dulling, although it still provided a close and comfortable shave. One unusual aspect noted was that at no time during the test did the blade pull the whiskers while cutting them, but only seemed to become duller with no shaving discomfort.

EXAMPLE 4

A shaving test is conducted to determine the effectiveness of solid volatile corrosion inhibitor in protecting a razor blade during storage between uses. The test subject is characterized as having a medium beard and medium sensitivity skin.

The test is conducted with a new Gillette Super Stainless razor blade. AFter After first shave, the razor and blade is rinsed off in warm water, shaken dry, and placed in a closed polyethylene container having a vent opening at its top. A body of solid volatile corrosion inhibitor in a cotton bag is located in the bottom of the container below a plastic shield that separates the razor storage chamber from the body of corrosion inhibitor, but does not completely enclose the chamber. The razor and razor blade is stored in the razor storage container between shaves throughout the test period. Comfortable shaves are obtained for an extended period of time.

While various embodiments of the invention have been described, it will be obvious to those skilled in the art that it is not so limited, but is susceptible of various changes and modifications, which are considered within the spirit and scope of the invention as defined by the attached claims.

Having now described my invention, I claim:

1. A device for storing cutting implements between intermittent uses that reduces deterioration of the cutting edges of the implement between uses, which comprises:
   an open topped container for receiving the implement;
   a lid removably closing the top of said container;
   a reservoir of volatile corrosion inhibitor contained within said container; and
   means to support said cutting implement within said container so that the cutting edges are in close proximity to, but out of contact with said reservoir of volatile corrosion inhibitor.

2. The device defined in claim 1 for storing cutting implements having moisture adhering thereto wherein said lid has an aperture to vent the interior of said container to the atmosphere.

3. The device defined in claim 1 wherein said reservoir of volatile corrosion inhibitor is a body of particulate solid volatile corrosion inhibitor having a vapor pressure between about 0.00001 and 0.1 mm Hg at 20° C.

4. The device defined in claim 1 wherein said reservoir of volatile corrosion inhibitor comprises an absorbent wick impregnated with a liquid volatile corrosion inhibitor having a vapor pressure between about 0.00001 and 0.1 mm Hg at 20° C.

5. A device for storing a safety razor either under dry conditions or with moisture adhering thereto that reduces deterioration of the cutting edge of the razor blade between intermittent uses, which comprises:
   an open-topped, integrally formed molded container;
   a lid removably closing the top of said container, said lid having an aperture to vent the interior of said container to the atmosphere;
   a razor support plate mounted in said container to separate said container into a lower corrosion inhibitor chamber and an upper razor storage chamber and to support said razor in said upper chamber out of contact with said lower corrosion inhibitor chamber, said support plate being discontinuous across the cross-section of said container to provide communication between said lower chamber and said upper chamber;
   means to support said razor support plate in said container; and
   a reservoir of volatile corrosion inhibitor in said lower chamber.

6. The device defined in claim 5 wherein said reservoir of volatile corrosion inhibitor is a body of particulate solid volatile corrosion inhibitor having a vapor pressure between about 0.00001 and 0.1 mm Hg at 20° C.

7. The device defined in claim 5 wherein said reservoir of volatile corrosion inhibitor comprises an absorbent wick impregnated with a liquid volatile corrosion inhibitor having a vapor pressure between about 0.00001 and 0.1 mm Hg at 20° C.

8. The device defined in claim 5 wherein said razor support plate comprises a thin, flexible member retained in a configuration having a curved cross-section transverse to its longitudinal axis, and wherein said razor support plate is mounted in said container to provide an elongate slot between the longitudinal edges of the support plate and the container walls.

9. The device defined in claim 8 wherein said reservoir of volatile corrosion inhibitor comprises a pair of flat pads of absorbent wicking material saturated with a liquid volatile corrosion inhibitor having a vapor pressure between about 0.0001 and 0.1 mm Hg at 20° C., one of said pads being located below each of said elongate slots.

10. The device defined in claim 9 including a pair of tabs projecting upwardly from the interior surface of the bottom of the container to retain said pads of absorbent wicking material in position below each of said elongate slots.

11. The device defined in claim 5 wherein said razor support plate comprises a thin, flat, perforate member extending substantially across the cross-section of said container.

12. A device for storing a safety razor either under dry conditions or with moisture adhering thereto that reduces deterioration of the cutting edge of the razor blade between intermittent uses, which comprises:

an open-topped, integrally-formed, molded container, the rear panel of said container including an upwardly extending tab portion having a recessed notch on its interior surface to receive the handle of a safety razor and an aperture to receive a mounting screw;

a lid removably closing the top of said container, said lid having an aperture to vent the interior of said container to the atmosphere;

a razor support plate mounted in said container to separate said container into a lower corrosion inhibitor chamber and an upper razor storage chamber and to support said razor in said upper chamber out of contact with said lower corrosion inhibitor chamber, said support plate being discontinuous across the cross-section of said container to provide communication between said lower chamber and said upper chamber;

means to support said razor support plate in said container; and a reservoir of volatile corrosion inhibitor in said lower chamber.

13. The device defined in claim 14 wherein said reservoir of volatile corrosion inhibitor is a body of particulate solid volatile corrosion inhibitor having a vapor pressure between about 0.00001 and 0.1 mm Hg. at 20° C.

14. The device defined in claim 12 wherein said reservoir of volatile corrosion inhibitor comprises an absorbent wick impregnated with a liquid volatile corrosion inhibitor having a vapor pressure between about 0.00001 and 0.1 mm Hg at 20° C.

15. The device defined in claim 12 wherein said razor support plate is mounted in said container to provide an elongate slot between the longitudinal edges of the support plate and the container walls.

16. The device defined in claim 15 wherein said razor support plate comprises a thin, flexible member retained in a configuration having a curved cross-section transverse to its longitudinal axis.

17. The device defined in claim 12 wherein said razor support plate comprises a thin, flat, perforate member extending substantially across the horizontal cross-section of said container.

18. A method for storing a cutting implement between intermittent uses under conditions where moisture is present that reduces deterioration of the cutting edge of the implement between uses, which comprises maintaining the cutting implement in a substantially closed environment maintained vented to the atmosphere and containing a reservoir of volatile corrosion inhibitor having a vapor pressure between about 0.00001 and 0.1 mm Hg at 20° C., said cutting implement being supported so that the cutting edges are in close proximity to, but out of contact with said reservoir of volatile corrosion inhibitor.

19. The method defined in claim 18, wherein said volatile corrosion inhibitor comprises dicyclohexlamine caprylate, diisopropylamine caprylate, or admixtures thereof.

20. The method defined in claim 18, wherein said volatile corrosion inhibitor is an admixture of sodium nitrite, urea and monoethanolamine benzoate.

21. The method defined in claim 18, wherein said volatile corrosion inhibitor is diisopropylammonium nitrite, dicyclohexylammonium nitrite or admixtures thereof in the proportion of between about 0.1 to 5 parts by weight of diisopropylammonium nitrite per part of dicyclohexlammonium nitrite.

22. The method defined in claim 18, wherein said cutting implement is a safety razor containing a razor blade.

23. A device for storing a safety razor either under dry conditions or with moisture adhering thereto that reduces deterioration of the cutting edge of the razor blade between intermittent uses, which comprises:

an open-topped, integrally formed, molded container;

a lid removably closing the top of said container, said lid being apertured to vent the interior of said container to the atmosphere;

a pair of absorbent pads saturated with a liquid volatile corrosion inhibitor having a vapor pressure between about 0.00001 and 0.1 mm Hg at 20° C.;

means to support said pads longitudinally within said container at each side thereof; and means to support said razor in said container in proximity to, but out of contact with said pads.

* * * * *

UNITED STATES PATENT OFFICE
CERTIFICATE OF CORRECTION

Patent No. 3,759,594                    Dated September 18, 1973

Inventor(s) JACK M. COBB

It is certified that error appears in the above-identified patent and that said Letters Patent are hereby corrected as shown below:

Claim 13, line 1, "14" should be --- 12 ---.

Signed and sealed this 25th day of December 1973.

(SEAL)
Attest:

EDWARD M. FLETCHER, JR.                RENE D. TEGTMEYER
Attesting Officer                      Acting Commissioner of Patents